United States Patent [19]
Maursey

[11] 3,790,297
[45] Feb. 5, 1974

[54] MICRO DRILL AND METHOD OF CONSTRUCTION

[76] Inventor: Ethan K. Maursey, 2123 Common Rd., Warren, Mich. 48092

[22] Filed: Oct. 25, 1972

[21] Appl. No.: 300,713

[52] U.S. Cl.................. 408/240, 408/226, 408/704
[51] Int. Cl............................................. B23b 51/02
[58] Field of Search... 408/226, 704, 199, 230, 713, 408/231, 232, 240, 239; 279/22, 75; 76/108 T

[56] References Cited
UNITED STATES PATENTS
2,393,424  1/1946  Selch .................................. 408/239

FOREIGN PATENTS OR APPLICATIONS
211,150  11/1940  Switzerland........................... 279/51

OTHER PUBLICATIONS
Popular Mechanics Shop Notes, 1942, Page 202

(Copy in Examiner's shoe cases)

Primary Examiner—Gil Weidenfeld

[57] ABSTRACT

The shank for a micro drill 0.06 inch in diameter or less is made from three-like cylindrical rods which are brazed together along engaging lines which are parallel to the center of the rods forming a triangular body with a central aperture therebetween which is also parallel to the rod centers. One end of the joined rods has a drill advanced into the aperture for drilling a hole therein for the driven end of the micro drill. The end may be supported within the drilled aperture by suitable adhesive such as an epoxy, a low temperature solder or the like so that the drill end can readily be removed in case of breakage for replacement without affecting the securement of the three rod sections together with the higher temperature brazing material.

7 Claims, 9 Drawing Figures

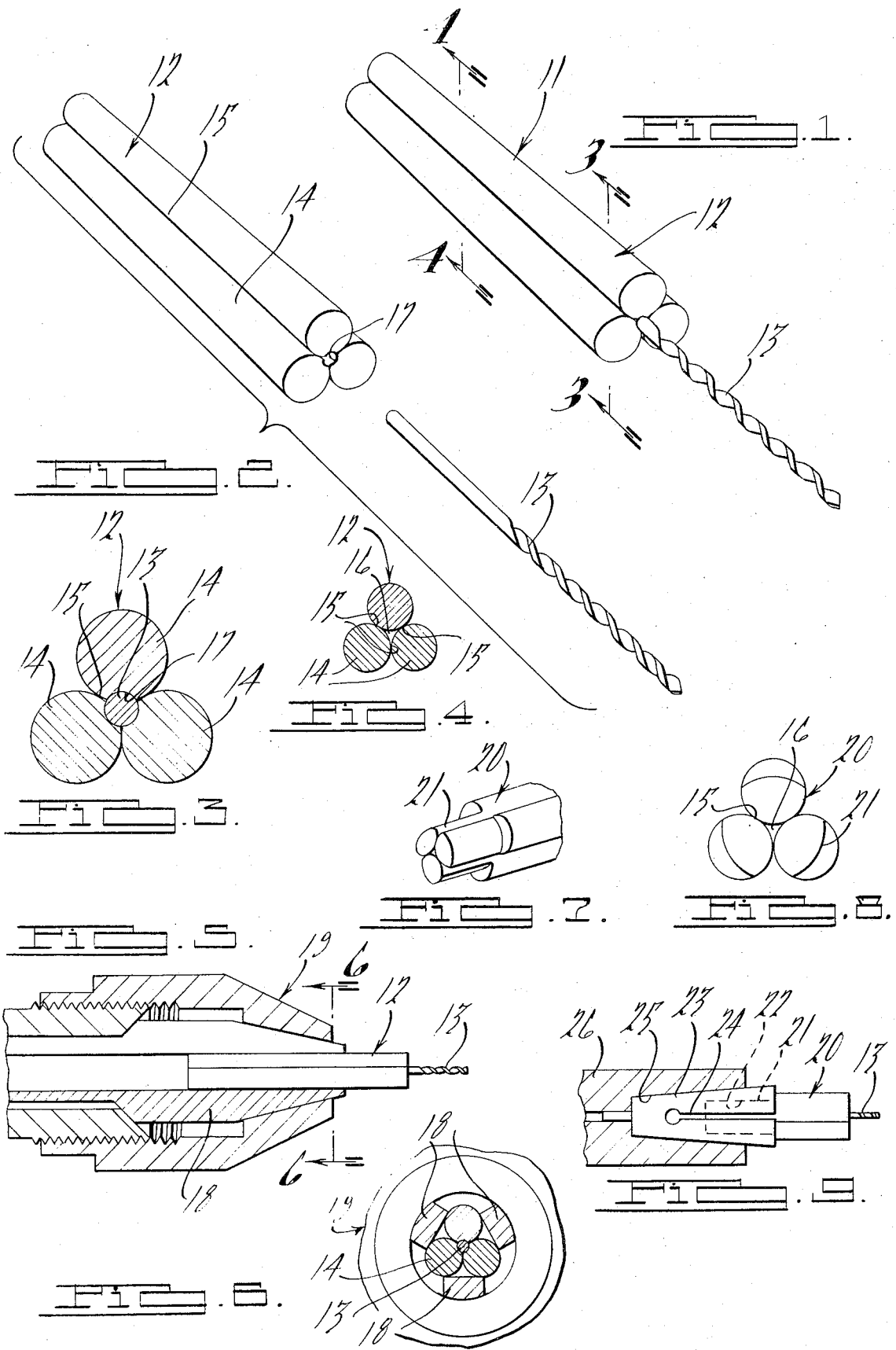

MICRO DRILL AND METHOD OF CONSTRUCTION

BACKGROUND OF THE INVENTION

Reference may be had to H. Latour, U.S. Pat. No. 2,968,200, that to H. I. Selch, U.S. Pat. No. 2,393,424, and that to A. Milleville, U.S. Pat. No. 3,051,025 to show the present state of the art.

SUMMARY OF THE INVENTION

The invention pertains to the formation of a shank for a micro drill which accurately supports the drill on its center and is accurately supported in the jaws of a chuck on the center thereof. The shank is contructed from three equal lengths of a cylindrical rod having the same diameter and preferably made of bronze or similar brazable material. The three rods are nested together in line contact engagement with their center lines disposed in parallel relation. The core of the assembled rods forms a central aperture into which a drill is advanced from one to a degree sufficient to receive the driven end of the micro drill. A low melting point material, such as a solder, is preferably employed for retaining the drill within the drilled hole so that in case of breakage the driven end can be removed by heating the shank without producing the separation of the rods as the brazing material will not be affected by the low heat of the solder. This assembly of the shank and drill with the center lines thereof coinciding eliminates the breakage which occurred in the past when a solid shank was drilled to receive the driven end of the micro drill. If the centers of the drill and shank are parallel but offset, and when disposed at an angle with the end of the drill disposed on one or the other side of the hole to be drilled, the micro drill will be severely strained and will result in early breakage. The assembly of the three rod sections to form the shank not only accurately locates the micro drill in the drilled hole but will provide a triangular configuration on the outside which when clamped by the three jaws of a chuck will center the shank and the micro drill on the center line of the chuck. This provides assurance that the drill will not be strained during the drilling operation resulting in a long life therefor.

BRIEF DESCRIPTION OF THE DRAWING

FIG. 1 is a perspective view of a micro drill mounted in an adapter shank embodying features of the present invention;

FIG. 2 is an exploded view of the structure illustrated in FIG. 1 with the micro drill separated from the shank;

FIG. 3 is an enlarged sectional view of the structure illustrated in FIG. 1, taken on the line 3—3 thereof;

FIG. 4 is a sectional view of the structure illustrated in FIG. 1, taken on the line 4—4 thereof;

FIG. 5 is a sectional view of a chuck having the shank of the micro drill secured in the jaws thereof;

FIG. 6 is a sectional view of the structure illustrated in FIG. 5, taken on the line 6—6 thereof;

FIG. 7 is a perspective view of the end of the shank of the drill illustrated in FIG. 1 with the end machined into cylindrical form;

FIG. 8 is an enlarged end view of the structure illustrated in FIG. 7 as viewed from the cylindrical end thereof, and FIG. 9 is a sectional view of a machine spindle having a tapered socket supported therein for engaging the cylindrical end of the adapter shank illustrated in FIGS. 7 and 8.

BRIEF DESCRIPTION OF THE PREFERRED EMBODIMENTS

The micro drill 11 has an adapter shank 12 which supports a micro drill 13 on the exact center thereof. The adapter shank is made from three like lengths of rod 14 of the same diameter which are secured together on engaging lines 15 which are parallel to the center line of the rod sections. This produces a center triangular aperture 16 having convex sides which is drilled at one end to provide a hole 17 for the driven end of the micro drill 13. The drilling of the aperture will maintain the center of the hole 17 exactly on the center of the aperture 16 since the drill will not drift as the same conditions exist in all three of the rod sections 14. The driven end of the micro drill is secured within the drilled hole 17 by any suitable material, epoxy, metal or the like. Preferably the drill 13 is secured by a low melting point material such as a solder in the hole 17 so that the driven end of the micro drill can be removed by heating the shank to melt the solder without affecting the brazing material which requires a higher temperature.

The shank 12 has the three sides falling on an equilateral triangle so that it will be precisely engaged by three jaws 18 of a chuck 19 as illustrated in FIGS. 5 and 6. This centers the shank 12 on the center line of the chuck with the center of the micro drill 13 falling thereon. This minimizes the breakage which could occur if the drill were slightly offset in a position parallel to the shank center or at an angle thereto.

In FIGS. 7, 8 and 9, a shank 20 is illustrated as having the end opposite to that supporting the micro drill 13 machined into a cylindrical form 21. The end of cylindrical form 21 is received within a cylindrical aperture 22 at one end of a collet 23 having an outer tapered truncated conical form which mates with a truncated conical recess 25 within a machine spindle 26. The collet 23 has a slot 24 through the wall which will be reduced in width when the collet is secured within the recess 25. This will cause the cylindrical aperture 22 to close upon the end of cylindrical form 21 of the adapter shank 20 and secure the micro drill within the collet.

When forming the shank 12 or 20 from the three sections of the rod of the same diameter and securing them in triangular relation as illustrated in the Figures, the micro drill will be accurately located on the center of the central aperture formed thereby. In this relationship the rod sections will have their center lines in exact parallel relation. The micro drill will be maintained on the center line of a chuck when secured within the jaws thereof. Since the micro drill is .06 inch in diameter or less, it is quite fragile and if the center lines do not coincide the breakage of the drill will occur. The construction of the adapter shank from the three rod sections provides a ready means for locating the supported micro drill exactly on the center line thereof.

I claim:

1. In a micro drill, an adapter shank comprising three like rod sections secured in unit relation with their axes disposed parallel to each other and to a central core aperture formed thereby, a cylindrical hole being provided in one end of the core aperture which is cut evenly into the three rod sections to maintain the axis thereof substantially coaxial with the axis of the core aperture and a micro drill fixedly secured in said core aperture and disposed on the axis thereof, whereby the drill axis is parallel to the axis of the core aperture and the axes of the rod sections.

2. In a micro drill as recited in claim 1, wherein said rod sections are secured together by a high temperature bonding material.

3. In a micro drill as recited in claim 2, wherein said micro drill is secured in said drilled hole by a lower temperature bonding material than that employed for said rod sections.

4. In a micro drill as recited in claim 3, wherein a line in the sides of the outer surface of said adapter shank falls in the three sides of an equilateral triangle.

5. In a micro drill as recited in claim 4, wherein said lines in the outer surface are engageable by the three jaws of a chuck in a manner which accurately centers the shank and drill on the center line of a chuck.

6. In a micro drill as recited in claim 1, wherein the end of the adapter shank opposite of that supporting the micro drill is cylindrical in form, and a collet having a cylindrical aperture for receiving the cylindrical end of the adapter shank.

7. In a micro drill as recited in claim 6, wherein said collet has an outer tapered surface and a slot extending through its wall into said cylindrical aperture, whereby when the collet is secured within a tapered spindle the cylindrical end of adapter shank will be clamped with collet aperture.

* * * * *